United States Patent
Ju et al.

(10) Patent No.: US 7,519,735 B1
(45) Date of Patent: Apr. 14, 2009

(54) SINGLE BOARD ROUTING ARRANGEMENT

(75) Inventors: Hann-Hwan Ju, San Jose, CA (US); Ashok Krishnamurthi, San Jose, CA (US); Ross Heitkamp, Mountain View, CA (US); Antony Chatzigianis, San Carlos, CA (US); Ken Kuwabara, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 737 days.

(21) Appl. No.: 09/851,363

(22) Filed: May 8, 2001

(51) Int. Cl.
*G06F 15/173* (2006.01)
(52) U.S. Cl. ........................ 709/243; 709/238
(58) Field of Classification Search .......... 370/392, 370/389, 351, 388, 395.53, 419, 200, 254, 370/236; 709/213, 224, 243, 238, 242, 420; 361/752; 395/200
See application file for complete search history.

(56) References Cited

U.S. PATENT DOCUMENTS

| | | | |
|---|---|---|---|
| 5,918,021 A * | 6/1999 | Aditya | 709/235 |
| 6,359,879 B1 * | 3/2002 | Carvey et al. | 370/351 |
| 6,553,408 B1 * | 4/2003 | Merrell et al. | 709/213 |
| 6,622,083 B1 * | 9/2003 | Knockeart et al. | 701/202 |
| 6,643,269 B1 * | 11/2003 | Fan et al. | 370/254 |
| 6,687,247 B1 * | 2/2004 | Wilford et al. | 370/392 |
| 6,724,757 B1 * | 4/2004 | Zadikian et al. | 370/388 |
| 6,754,210 B1 * | 6/2004 | Ofek | 370/389 |
| 6,760,328 B1 * | 7/2004 | Ofek | 370/389 |
| 6,826,195 B1 * | 11/2004 | Nikolich et al. | 370/465 |
| 7,010,232 B1 * | 3/2006 | Ott | 398/164 |
| 7,069,368 B2 * | 6/2006 | Thornton | 710/301 |
| 7,218,632 B1 * | 5/2007 | Bechtolsheim et al. | 370/389 |
| 2005/0010695 A1 * | 1/2005 | Coward et al. | 709/253 |
| 2006/0126644 A1 * | 6/2006 | Akahane et al. | 370/395.53 |

* cited by examiner

*Primary Examiner*—John Follansbee
*Assistant Examiner*—Karen C Tang
(74) *Attorney, Agent, or Firm*—Shumaker & Sieffert, P.A.

(57) ABSTRACT

A network router employs a single board architecture that includes both a forwarding engine and an interface card concentrator. All of the circuits involved in routing are incorporated into a single board, reducing the system cost of the router. A single processor performs various functions in connection with these circuits, such as management of interface cards and the forwarding engine. In addition to lowering the system cost, the compact architecture allows higher density installation of interface cards.

43 Claims, 7 Drawing Sheets

SINGLE BOARD ROUTING ARRANGEMENT

TECHNICAL FIELD

The invention relates to computer networks and, more particularly, to managing network routers.

BACKGROUND

A computer network is a collection of interconnected computing devices that exchange data and share resources. In a packet-based network, such as the Internet, the computing devices communicate data by dividing the data into small units called packets. The packets are individually routed across the network from a source device to a destination device. The destination device extracts the data from the packets and assembles the data into its original form. Dividing the data into packets enables the source device to resend only those individual packets that may be lost during transmission.

Devices within the network, often referred to as routers, forward packets through the network according to destination addresses in the packets. To route packets through the network, a router maintains one or more tables of routing information that describe available routes through the network. Each route defines a path between two locations on the network. Upon receiving an incoming data packet, the router examines header information within the packet to identify the destination for the packet. Based on the header information, the router performs a lookup in the routing table (or a forwarding table derived from the routing table), selects an appropriate route for the packet and forwards the packet accordingly.

A router incorporates a number of hardware components to perform functions such as packet forwarding and route updates. In one architecture, the router includes a routing engine and a packet forwarding engine. The routing engine maintains one or more routing tables and, based on the routing tables, creates a forwarding table that describes how to forward an outbound data packet based on a destination address associated with the outbound data packets. The routing engine sends this forwarding table to the packet forwarding engine, which forwards packets between incoming and outgoing interfaces based on addresses contained in the packets.

In particular, the packet forwarding engine performs a lookup in the forwarding table based on the destination address associated with the packet and sends the packet out to the network using the appropriate outgoing interface. The packet forwarding engine may perform other functions, including, for example, filtering, sampling, policing, and rate limiting in connection with performing packet forwarding. In some architectures, hardware components for performing these and other functions are implemented using application specific integrated circuits (ASICs) distributed across multiple modules. These modules include, for example, a system control module, an interface card concentrator, and multiple interface cards directly connected to the interface card concentrator.

Distributing the ASICs across multiple modules provides flexibility to the user by allowing the user to purchase only as many interface card concentrators as needed. In addition, if a component, e.g., one of the ASICs, fails, the router can be serviced relatively inexpensively by replacing only the malfunctioning module. Because the interface cards are directly connected to the interface card concentrator, however, they are removed along with the concentrator before replacing the concentrator.

The multiple module architecture offers certain advantages in flexibility and serviceability, but it also has some drawbacks. For example, the system cost of the router is relatively high. In addition, processors in the modules communicate with each other using, for example, an Ethernet connection. While an Ethernet connection can communicate data at relatively high speeds, it still introduces some delay into the system.

SUMMARY

The invention provides a packet forwarding architecture that incorporates a system control module and an interface card concentrator into a single hardware module. A forwarding engine includes application specific integrated circuits (ASICs) for memory management, packet processing, and route lookup. A single processor performs various functions in connection with the ASICs, such as management of interface cards and the forwarding engine.

Integrating the ASICs and the processor into a single hardware module realizes a lower system cost, as well as a more compact and less complex architecture that allows interface cards to be installed with greater density. The reduced number of components also offers greater reliability. In addition, the single module architecture reduces the need for communication between different hardware modules and delays associated with such inter-module communication. Code development may be made more streamlined by reducing or eliminating coding of functionality that would otherwise be duplicated across multiple modules. Further, locating the ASICs in a single hardware module obviates the need to connect the interface cards directly to the interface card concentrator, thereby allowing the hardware module to be serviced without removing the interface cards and without disrupting their operation.

One embodiment of the invention is directed to a routing device that includes at least one interface module to communicate data packets using a network. A router module manages the interface modules and forwards data packets to their destinations to be output on the network. The router module may include a forwarding engine that integrates a system control module and an interface module concentrator into a single unit. Data packets are received through interface modules that are connected to the network. The interface module concentrator manages the interface modules by, for example, performing packet processing on data packets communicated with the network using the interface modules. The interface module concentrator may also perform other functions, such as storing data associated with inbound and/or outbound packets and managing memory accesses to read and write this data. The system control module forwards the data packets to their destinations to be output on the network. A midplane may be coupled to the interface module or modules and to the forwarding engine. Alternatively, the interface module or modules can be connected directly to the forwarding engine without the use of a midplane. A routing engine may also be connected directly to the forwarding engine.

In another embodiment, a routing device includes interface cards to communicate data packets using a network. A router module integrates a packet processing circuit, a memory management circuit, and a route lookup circuit into a single module. A midplane is coupled to the router module and to the interface cards. Alternatively, the interface module or modules can be connected directly to the forwarding engine without the use of a midplane. A routing engine may also be connected directly to the forwarding engine.

Other embodiments include routing arrangements that combine multiple single board routing devices into scalable routers capable of communicating data with higher bandwidth, as well as methods of manufacturing such routing devices and routing arrangements. Yet another embodiment is directed to a router comprising one hardware board that integrally houses a packet processing circuit, a memory management circuit, and a route lookup circuit.

The above summary of the invention is not intended to describe every embodiment of the invention. The details of one or more embodiments of the invention are set forth in the accompanying drawings and the description below. Other features, objects, and advantages of the invention will be apparent from the description and drawings, and from the claims.

DETAILED DESCRIPTION

A network router in accordance with the principles of the invention employs a single-board architecture that includes both a system control module and one or more interface card concentrators. The router receives data packets using interface cards connected to a network. The system control module forwards these packets from the interface cards through which they are received to their destinations based on selected routes. The interface card concentrator manages the interface cards by, for example, performing packet processing on data packets communicated with the network using the interface modules. The interface module concentrator may also perform other functions, such as storing data associated with inbound and/or outbound packets and managing memory accesses to read and write this data.

All of the ASICs involved in routing are incorporated into a single board, reducing the number and complexity of components needed to implement the router and, as a result, the system cost of the router. Reducing the number of components also improves the overall reliability of the router. With the interface card concentrator incorporated into the board, the router can be serviced without removing the interface cards. A single processor performs various functions in connection with the ASICs, such as management of interface cards and the forwarding engine. Further, the compact architecture allows higher density installation of interface cards. Integrating the system control module and the interface card concentrators into a single hardware module also reduces the need for communication between different hardware modules and delays associated with such inter-module communication. Code development may be made more streamlined by reducing or eliminating coding of functionality that would otherwise be duplicated across multiple modules.

Figure 1:
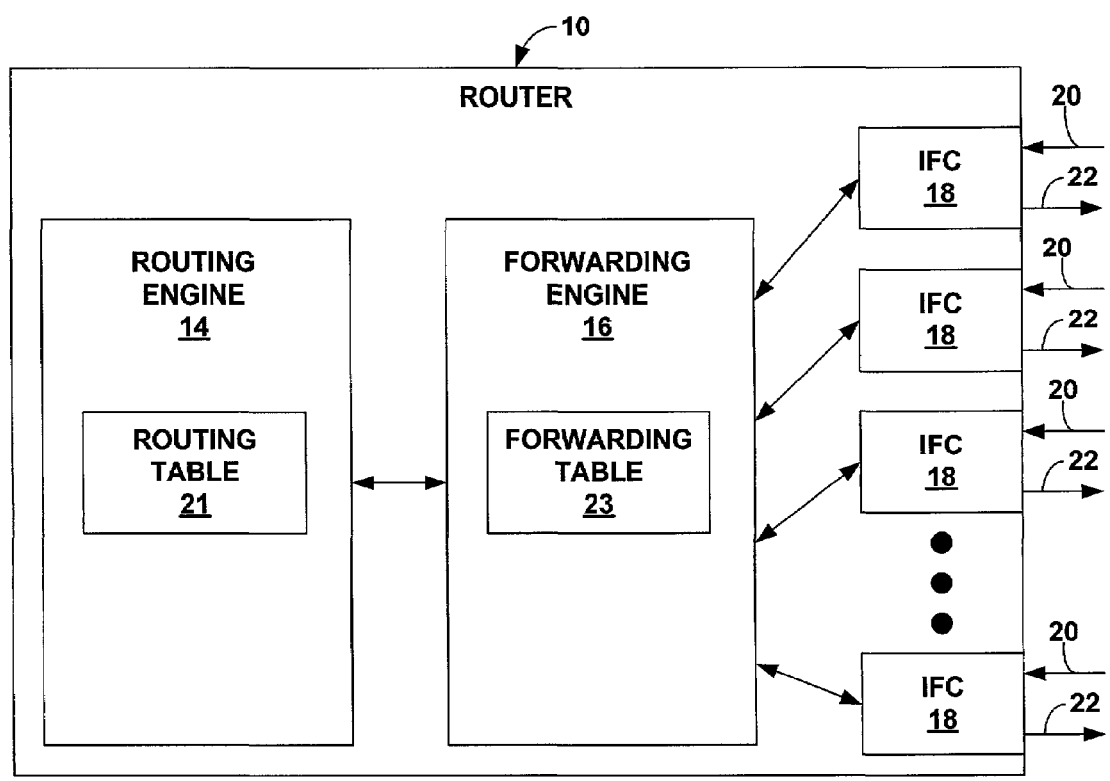
FIG. 1 is a block diagram illustrating an example network router consistent with the principles of the invention.

FIG. 1 is a block diagram illustrating an example network router 10 in accordance with the principles of the invention. Network router 10 receives and forwards data packets across a network. As shown in FIG. 1, router 10 includes a routing engine 14 and a forwarding engine 16. Router 10 also includes one or more interface cards (IFCs) 18 for receiving and sending data packets via network links 20 and 22, respectively. Forwarding engine 16 routes inbound packets received from inbound link 20 to the appropriate outbound link 22 or to routing engine 14. Forwarding engine 16 routes packets according to routing information stored in a forwarding table 23.

Routing engine 14 maintains and updates the routing information within routing table 21 and propagates the route information to forwarding table 23. Upon receiving an inbound packet, forwarding engine 16 examines information within the packet to identify the destination of the packet. Based on the destination, forwarding engine 16 selects an available route from forwarding table 23 and forwards the packet to one of the IFCs 18.

Figure 2:
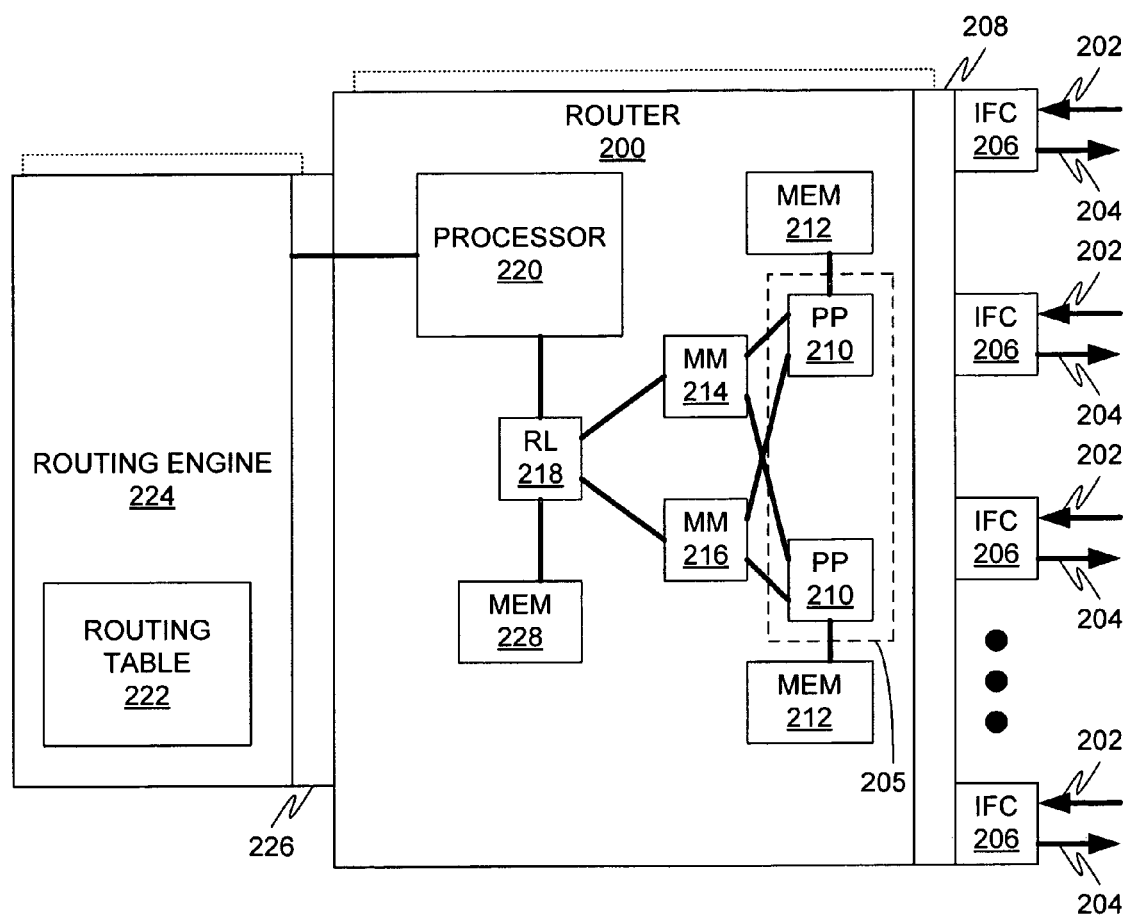
FIG. 2 is a block diagram illustrating a hardware implementation of a network router consistent with the principles of the invention.

FIG. 2 is a block diagram illustrating a hardware implementation of a network router 200 consistent with the principles of the invention. Network router 200 receives and sends data packets via network links 202 and 204, respectively, using interface cards (IFCs) 206 connected via a passive midplane 208, which also distributes power to IFCs 206. In the implementation shown in FIG. 2, network router 200 includes up to eight IFCs 206, four of which are depicted. As indicated by the dashed lines on FIG. 2, an optional redundant network router provides backup in case network router 200 needs to be replaced. If the redundant network router is used, both network router 200 and the redundant network router are connected to IFCs 206 via midplane 208. A control signal is used to switch control from network router 200 to the redundant network router without disrupting the operation of IFCs 206.

An interface card concentrator 205 manages the IFCs by performing packet processing on inbound and outbound data packets communicated via IFCs 206. The interface card concentrator 205 may perform additional functions related to communicating data packets to and from IFCs 206, including, for example, storing the data packets in memory 212. In the embodiment shown in FIG. 2, the interface card concentrator 205 includes two packet processing ASICs 210 that process data received through IFCs 206 and assemble outbound packets for sending through IFCs 206, as described more fully below. Each packet processing ASIC 210 can process inbound and outbound data for up to four IFCs 206. In connection with assembling outbound packets, each packet processing ASIC 210 reads data from memory 212. Memory 212 can be implemented using, for example, a conventional SDRAM device.

Memory management ASICs 214 and 216 coordinate memory accesses by packet processing ASICs 210. When router 200 receives a packet through a network link 202, memory management ASIC 216 writes data to memory 212 associated with packet processing ASICs 210. When a packet is assembled and sent, memory management ASIC 214 reads data from memory 212 associated with packet processing ASICs 210.

A route lookup ASIC 218 performs route lookup operations based on notifications received from memory management ASIC 216 when a packet is received through a network link 202. Upon receiving an inbound packet, route lookup ASIC 218 examines information within the packet to identify the destination of the packet. Based on the destination, route lookup ASIC 218 selects an available route and forwards the packet to one of the IFCs 206 or to processor 220. Processor 220 forwards protocol packets to routing engine 224 via an Ethernet connection 226. Routing engine 224 then updates a routing table 222 and propagates any route changes to processor 220. Processor 220 then stores the selected routes in a forwarding table stored, for example, in a memory 228. Memory 228 may be implemented using a conventional SRAM device.

Figure 3:
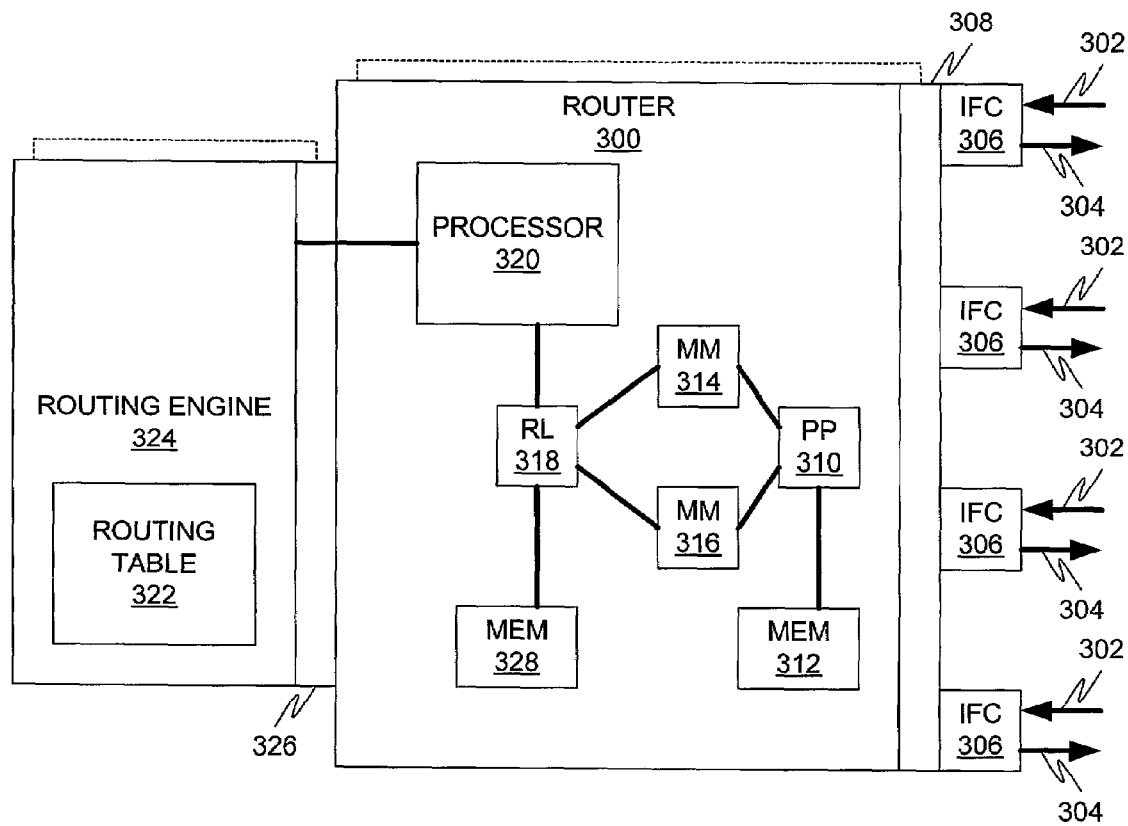
FIG. 3 is a block diagram illustrating another hardware implementation of a network router consistent with the principles of the invention.

FIG. 3 is a block diagram illustrating another hardware implementation of a network router 300 consistent with the principles of the invention. Network router 300 receives and sends data packets via network links 302 and 304, respectively, using interface cards (IFCs) 306 connected, for example, via a passive midplane 308. Alternatively, IFCs 306 may be connected directly to router 300 without midplane 308. While network router 300 of FIG. 3 includes four IFCs 306, fewer IFCs 306 may be used. As indicated by the dashed lines on FIG. 3, an optional redundant network router provides backup in case network router 300 needs to be replaced. If the redundant network router is used, both network router 300 and the redundant network router are connected to IFCs 306 via midplane 308. A control signal is used to switch control from network router 300 to the redundant network router without disrupting the operation of IFCs 306.

An interface card concentrator manages the IFCs by performing packet processing on inbound and outbound data packets communicated via IFCs 306. The interface card concentrator may perform additional functions related to communicating data packets to and from IFCs 306, including, for example, storing the data packets in memory 312. In the embodiment shown in FIG. 3, the interface card concentrator includes a packet processing ASIC 310 that processes data received through IFCs 306 and assembles outbound packets for sending through IFCs 306, as described more fully below. Packet processing ASIC 310 can process inbound and outbound data for up to four IFCs 306. In connection with assembling outbound packets, packet processing ASIC 310 reads data from memory 312, which can be implemented using, e.g., a conventional SDRAM device.

Memory management ASICs 314 and 316 coordinate memory access with packet processing ASIC 310. When router 300 receives a packet through a network link 302, packet processing ASIC 310 performs packet processing on the incoming packet, including removal of packet headers and isolation of the packet. Next, memory management ASIC 316 writes the processed packet contents to memory 312 associated with packet processing ASIC 310. When packet processing ASIC 310 prepares an outgoing data packet for transmission using the network, memory management ASIC 314 reads the data to be assembled into the outgoing packet from memory 312 associated with packet processing ASIC 310.

A route lookup ASIC 318 performs route lookup operation based on notifications received from memory management ASIC 316 when a packet is received through a network link 302. Upon receiving an inbound packet, route lookup ASIC 318 examines information within the packet to identify the destination of the packet. Based on the destination, route lookup ASIC 318 selects an available route and forwards the packet to one of the IFCs 306 or to processor 320. Processor 320 forwards protocol packets to routing engine 324 via an Ethernet connection 326. Routing engine 324 then updates a routing table 322 and propagates any route changes to processor 320. Processor 320 then stores the selected routes in a forwarding table stored, for example, in a memory 328. Memory 328 may be implemented using a conventional SRAM device.

Figure 4:
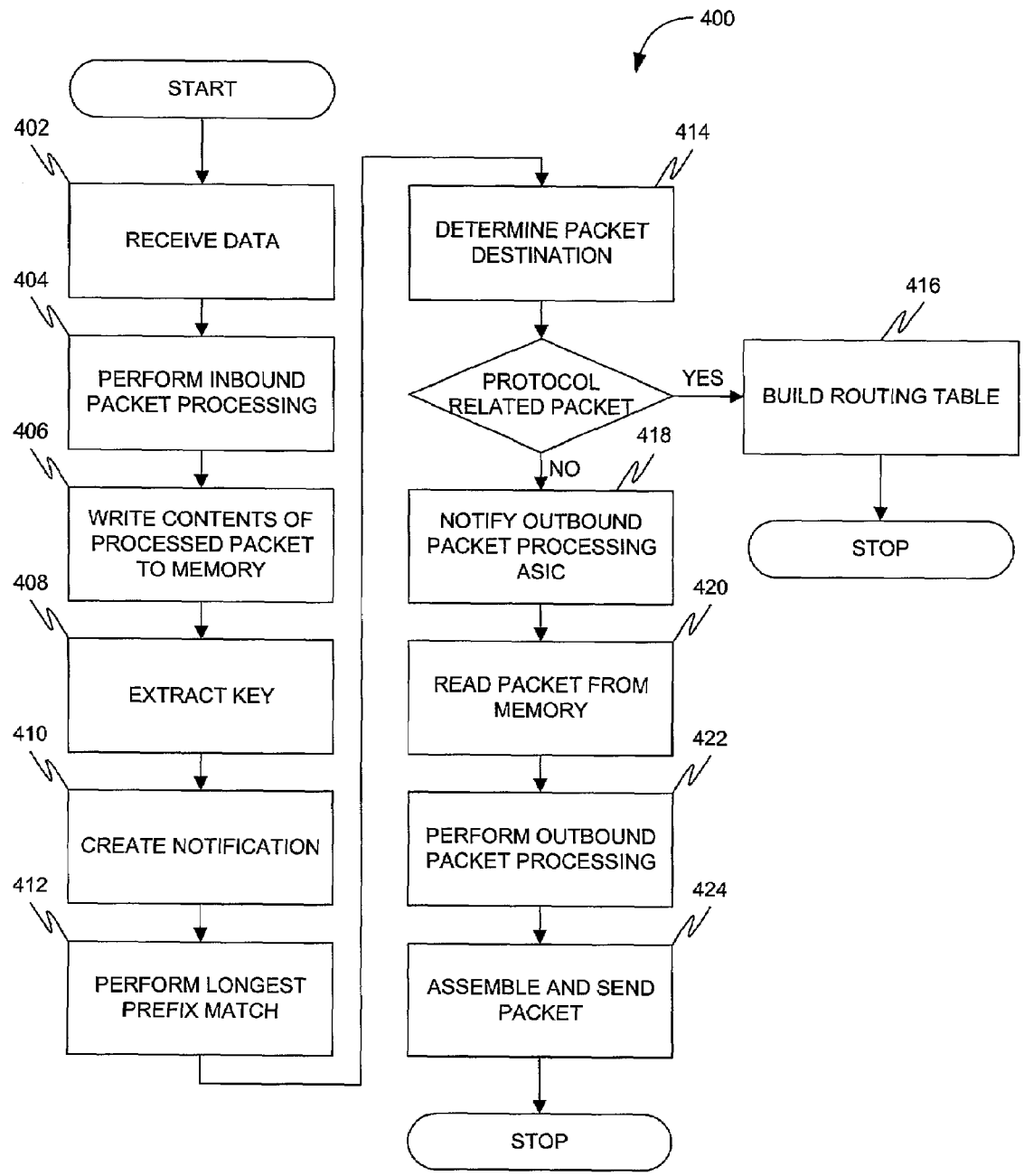
FIG. 4 is a flow diagram illustrating a mode of operation of a network router consistent with the principles of the invention.

FIG. 4 is a flow diagram illustrating a mode of operation of network router 200 consistent with the principles of the invention. While this discussion refers to various components of network router 200, it is to be understood that network router 300 operates substantially similarly, with the exception that network router 300 uses only one packet processing ASIC 310 rather than the two packet processing ASICs 210 used by network router 200.

When network router 200 receives data (402) via an interface card (IFC) 206, the packet processing ASIC 210 associated with the receiving IFC 206 performs inbound L2 and L3 packet processing on the received data (404). More particularly, packet processing ASIC 210 examines the L2 and L3 headers of the incoming packet and extracts the necessary parameters from them. Packet processing ASIC 210 can then remove the L2 headers from the packet. Next, memory management ASIC 216 distributes the contents of the processed packet into the memory 212 associated with packet processing ASICs 210 (406).

Memory management ASIC 216 also extracts a key from the processed packet (408). This key includes, for example, source and destination address and port information associated with the packet. Based on the extracted information, memory management ASIC 216 creates a notification (410) and sends it to route lookup ASIC 218. Route lookup ASIC 218 uses several key engines (not shown in FIG. 2) to perform a longest prefix match on the notification based on the key (412). Based on the results of the longest prefix match, route lookup ASIC 218 sends the notification to processor 220, which in turn sends the notification to routing engine 224 or to another memory management ASIC 214, which in turn sends the notification to the selected packet processing ASIC 210.

Route lookup ASIC 218 analyzes the notification and, based on the contents of forwarding table 228, determines the destination of the packet (414), which is usually one of the IFCs 206. Occasionally, e.g., when the packet relates to protocol, the packet is instead sent back to routing engine 224, which uses the packet to build routing table 222 (416). Thus, some of the packets may be destined for router 200 itself, and not require forwarding.

In most cases, however, the packet is sent to memory management ASIC 214, which notifies (418) the packet processing ASIC 210 associated with the IFC 206 that was selected to send the packet via its outbound network link 204. In response to this notification, packet processing ASIC 210 reads the packet from memory 212 by issuing read commands to memory management ASIC 216 and receiving the packet data from memory management ASIC 214 (420). Packet processing ASIC 210 then performs outbound packet processing (422). More particularly, packet processing ASIC 210 analyzes the L2 descriptor information, builds an L2 header, and rewrites some of the L3 header information. Finally, packet processing ASIC 210 assembles the outbound packet and sends it to the network via the selected outbound link 204 (424).

Figure 5:
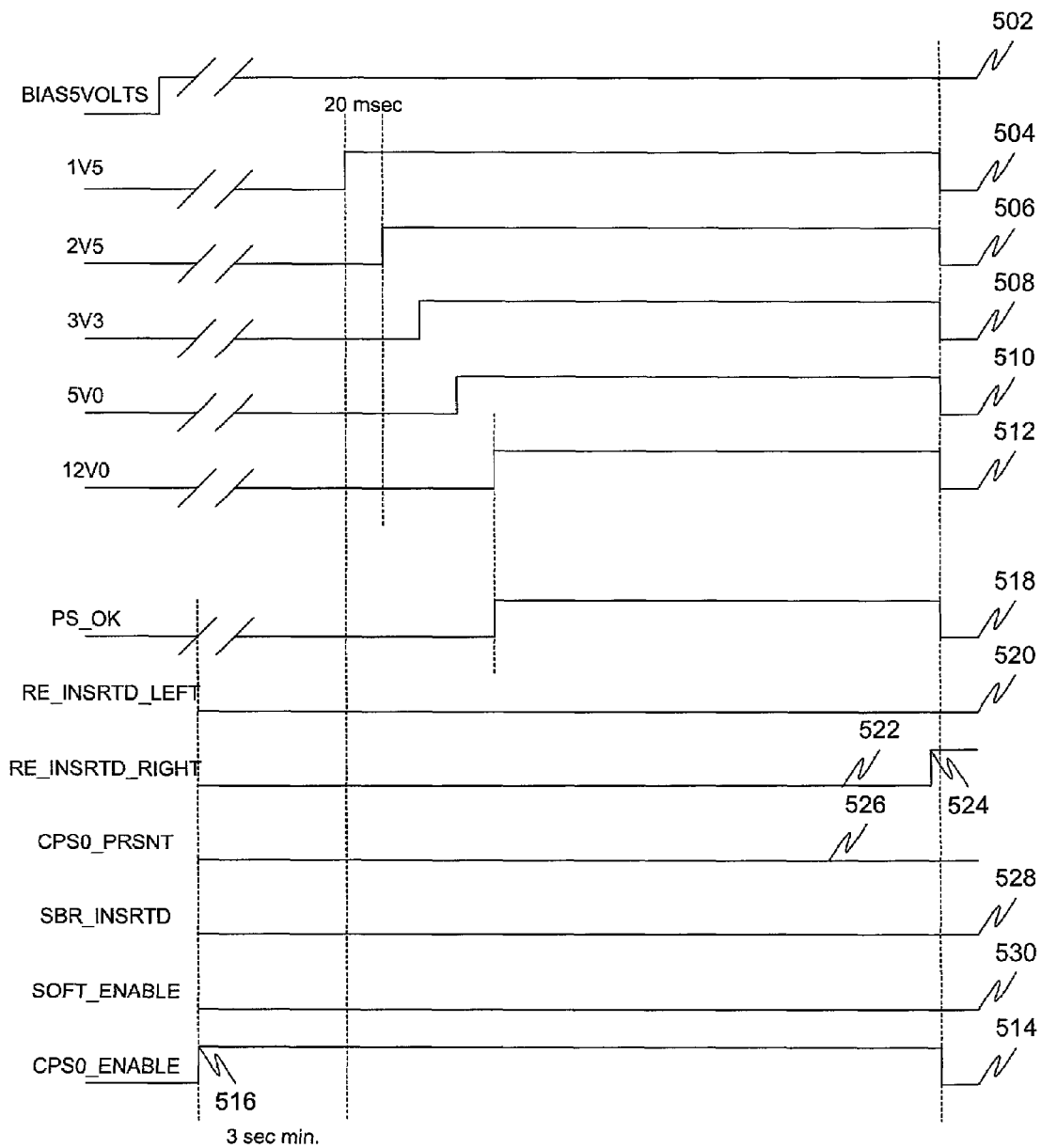
FIG. 5 is a timing diagram illustrating a power sequence of a network router.

In one implementation, the single board network router uses two redundant power supplies connected to the midplane, each having an output of 400 watts. The midplane distributes power to the IFCs and other components. FIG. 5 is a timing diagram illustrating an example power up sequence of the single board network router. Each power supply provides a bias voltage 502 of 5 V, as well as power signals of 1.5 V, 2.5 V, 3.3 V, 5 V, and 12 V, denoted respectively at reference numerals 504, 506, 508, 510, and 512. These power signals can be powered up or powered down individually using an enable signal (not shown). Additionally, the 1.5 V, 2.5 V, 3.3 V, and 5 V power signals can be margined using either sense lines from the single board router or dedicated lines on the power supply. Sense lines from the single board router are used for precise regulation of the voltage.

After an enable signal 514 is asserted (516), the 1.5 V power signal 504 is asserted after a delay of at least 3 seconds that is enforced by the power supply. The other power signals are subsequently asserted one at a time, with delays of approximately 20 msec between assertion of power signals. When the 12 V power signal 512 is asserted, a power supply verification signal 518 becomes active.

Routing engine insertion signals, indicated at reference numerals 520 and 522, are tied to ground pins at opposite ends of the router engine and, when in the low state, indicate that the routing engine, e.g., routing engine 224 of FIG. 2, is properly and fully inserted before the power supplies can be enabled. Both of these signals must be in the low state before the power supplies can be enabled. The signals can, however, be overridden by a jumper to allow the power supplies to be enabled without full insertion of the router engine for debugging purposes. In the particular timing sequence illustrated in FIG. 5, one of the router engine insertion signals enters the high state (524), indicating that one end of the router engine has come out of full insertion. Consequently, power signals 504, 506, 508, 510, and 512, enable signal 514, and power supply verification signal 518 are turned off.

A power supply verification signal 526 originates from the power supply and indicates its presence. This signal is used to gate enable signal 514 so that a missing power supply will not be enabled. A grounded router insertion signal 528 originates on the single board router and is in the low state only when the single board router is fully and properly inserted on the midplane. Router insertion signal 528 is also used to gate enable signal 514 so that the power supply will not be enabled if the single board router is not fully and properly inserted on the midplane.

The software executed by the processor can also disable either or both of the power supplies using a software enable signal 530. Software-initiated disabling of the power supplies may be necessary, for example, when the software detects that a fan is not operating properly, or when the temperature exceeds a threshold.

The power up sequence is started by a boot circuit, which may be implemented using a complex programmable logic device (CPLD). The boot circuit may use a watchdog timer to restart the router when control of the single board router is lost. When control is lost, the watchdog timer begins counting at prescribed intervals, for example, every 800 microseconds. The timer is reset by a power-on reset. If the timer is not reset within a certain time limit, various actions are taken to attempt to regain control.

Figure 6:
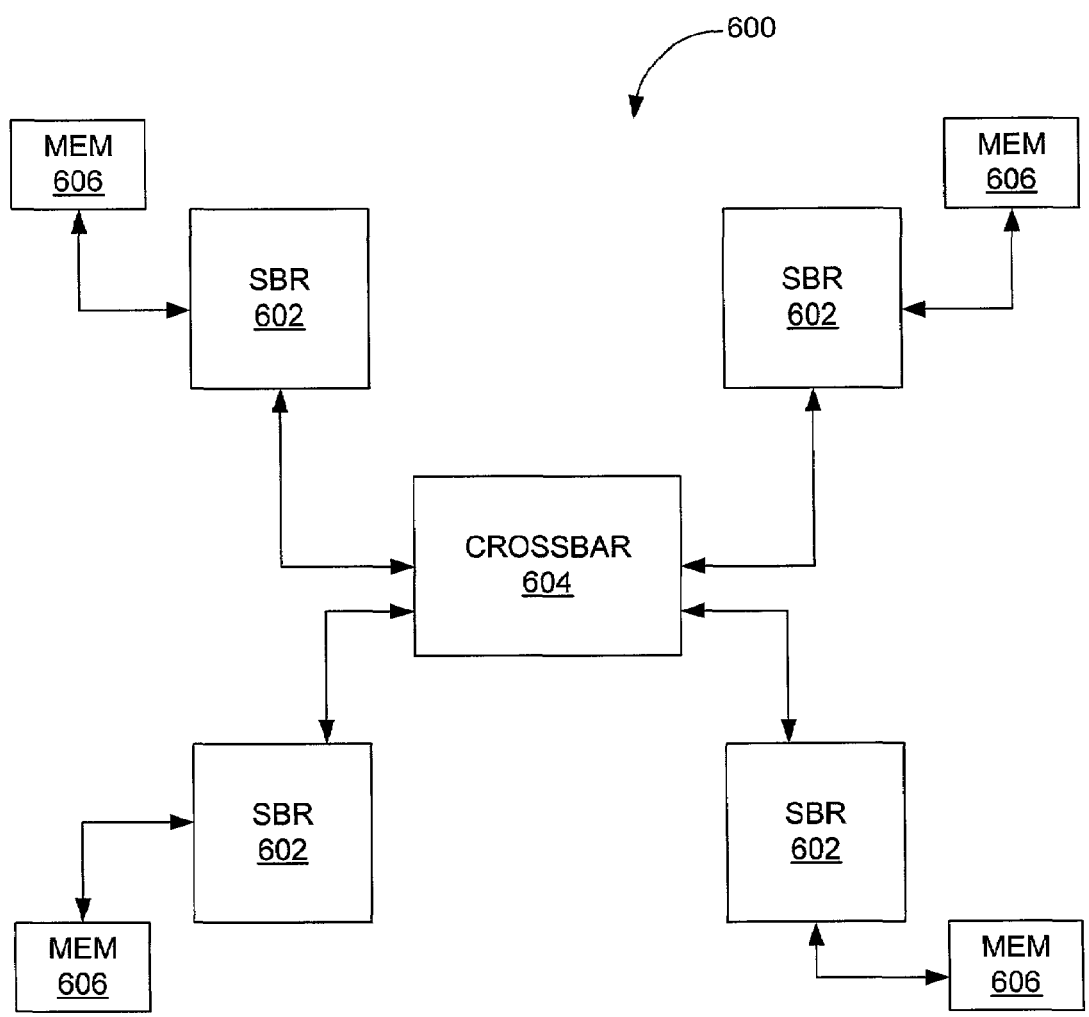
FIG. 6 is a block diagram illustrating a scalable router arrangement consistent with the principles of the invention.

In another embodiment of the invention depicted in FIG. 6, multiple single board network routers 602 are connected together using a conventional crossbar arrangement 604 to form a scalable router arrangement 600 having a higher bandwidth. FIG. 6 shows four single board network routers 602 arranged in this way, but more or fewer routers 602 can be used to scale the arrangement 600 to the bandwidth needs of the particular application. Each single board network router 602 can be implemented as network router 200 of FIG. 2 or network router 300 of FIG. 3. Scalable router arrangement 600 can also incorporate one or more other routers that may or may not use a single board architecture.

In scalable router arrangement 600, incoming data is stored in a memory 606 associated with the single board network router 602 that received the data. Outbound data is forwarded to and stored in a memory 606 associated with an appropriate destination router 602. Using a conventional switching arrangement (not shown), an interface card can be associated with multiple, redundant single board network routers 602. As a result, if one router 602 associated with an interface card fails, it can be serviced without disrupting the operation of the interface card by switching to a redundant router 602.

Figure 7:
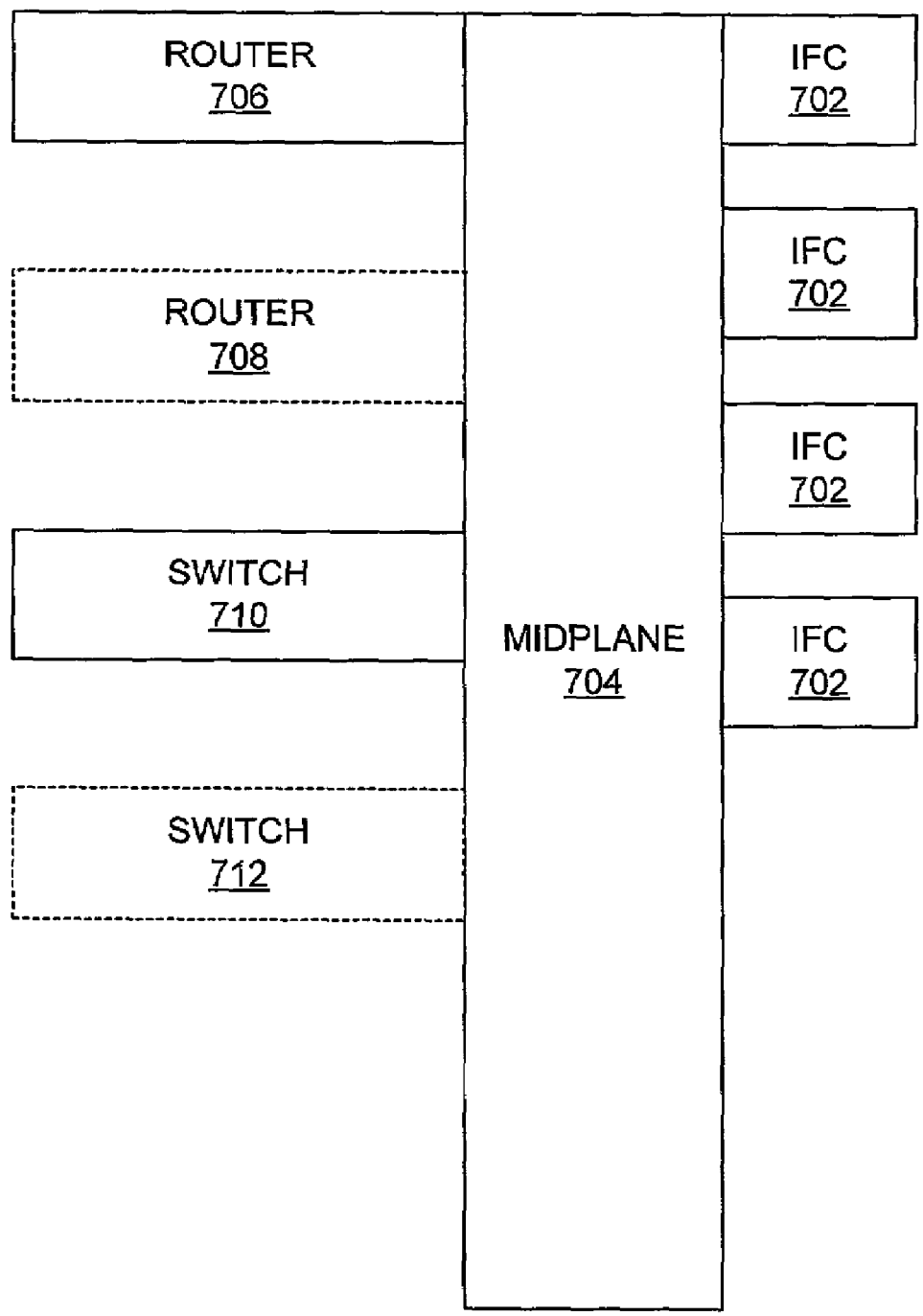
FIG. 7 is a diagram illustrating an example physical configuration of a redundant router arrangement consistent with the principle of the invention.

FIG. 7 is a diagram illustrating an example physical configuration of a router arrangement 700. Interface cards 702 are connected to the front end of a midplane 704. The rear end of midplane 704 is connected to a single board network router 706, which may be implemented as network router 200 of FIG. 2 or network router 300 of FIG. 3. Single board network router 706 may be implemented using a single printed circuit card that interconnects the router components, including, for example, packet processing ASIC 210, memory management ASIC 216, and route lookup ASIC 218 of FIG. 2. Router arrangement 700 may also include one or more redundant network routers 708. As described above in connection with FIG. 6, if one router 706 fails, it can be serviced without disrupting the operation of interface cards 702 by switching to redundant router 708. IFCs and routers are connected via midplane 704 and a switch 701. An optional redundant switch 712 may be used to connect the IFCs and routers if switch 710 fails.

Router arrangement 700 may offer a number of benefits. For instance, because interface cards 702 are connected to the front of midplane 704 and router 706 is connected to the rear of midplane 704, router 706 can be serviced without removing interface cards 702. Serviceability is further improved with the use of redundant router 708.

As described above, the single board routing architecture may offer several advantages. For example, using a single processor to handle both interface card management and forwarding engine management eliminates the need for communication between several processors, thereby improving processing speed. In addition, duplicate functionality is also eliminated. Space and cost efficiencies are realized by integrating all of the ASICs involved in routing into a single board. The improved space efficiency facilitates higher density installation of interface cards. Moreover, multiple routers can be combined for scalability and/or redundancy.

Various embodiments of the invention have been described. While some embodiments of the invention have been described in the context of a single board architecture, the invention is not so limited. For example, the router may be implemented using a multiple board architecture in which all ASICs, with the exception of any ASICs contained in the interface cards, are distributed among two or more boards, but are still isolated from the interface cards by the midplane. Isolating the interface cards from the other components using the midplane allows the router to be serviced without removing the interface cards, and without disrupting the operation of the interface cards. These and other embodiments are within the scope of the following claims.

The invention claimed is:

1. A routing device comprising:
   a midplane;
   a power supply coupled to the midplane to supply power along the midplane;

a plurality of removable interface cards removably coupled to the midplane to communicate packets using a network; and a router module removably coupled to the midplane separate from the plurality of removable interface cards, the router module comprising a packet forwarding engine, memory, a memory management unit, and an interface card concentrator module wherein the packet forwarding engine, memory management unit, and the interface card concentrator module are integrated into a single unit, wherein the midplane provides power from the power supply to the router module only when the router module is properly inserted into the midplane, wherein the interface card concentrator module receives packets from at least two of the removable interface cards, wherein contents of the received packets are stored in the memory, wherein the memory management unit generates notifications based on keys of the received packets and forwards the notifications to the packet forwarding engine, wherein the packet forwarding engine performs route lookups for the packets based on the keys in response to the notifications, and wherein the interface card concentrator module sends the packets from the memory to the removable interface cards as output bound packets based on the route lookups performed by the packet forwarding engine in response to the notifications.

2. The routing device of claim 1, wherein the interface card concentrator assembles the output bound packets from data stored in the memory and forwards the output bound packets to the plurality of removable interface cards.

3. The routing device of claim 1, wherein the interface card concentrator processes inbound packets received from the plurality of removable interface cards to remove the keys from the inbound packets, and stores data from the processed inbound packets in the memory.

4. The routing device of claim 1, wherein the memory comprises an SDRAM device.

5. The routing device of claim 1, wherein the notifications are generated based on extracted information that includes at least one of source address information, destination address information, source port information, and destination port information.

6. The routing device of claim 1, wherein the packet forwarding engine is configured to select the routes for the packets received from the at least two different ones of the plurality of removable interface cards by referencing a forwarding table based on the extracted information, and wherein the forwarding table stores the route information for forwarding data packets received from any of the plurality of removable interface cards.

7. The routing device of claim 6, further comprising a routing engine to store a routing table.

8. The routing device of claim 6, further comprising another memory to store the forwarding table.

9. The routing device of claim 6, wherein the memory management unit is configured to forward the packets to the plurality of removable interface cards based on the selected route.

10. The routing device of claim 1, further comprising a redundant router module to process the data packets and to forward the data packets between the removable interface cards in response to malfunction of the router module.

11. The routing device of claim 1, wherein the memory management unit is configured to provide packet data to the packet processing circuit.

12. The routing device of claim 1, wherein the memory is further configured to store output bound data.

13. The routing device of claim 5, wherein the packet forwarding module is configured to select the route by performing a longest prefix match based on the extracted information.

14. The routing device of claim 1, wherein the packet processing circuit is configured to remove an L2 header from an incoming data packet.

15. The routing device of claim 1, wherein the packet processing circuit is configured to build L2 headers for the output bound packets.

16. A routing arrangement comprising:

a crossbar arrangement; and a plurality of routing devices coupled to the crossbar arrangement, at least one routing device comprising:

a midplane;

a power supply coupled to the midplane to supply power along the midplane;

a plurality of removable interface cards removably coupled to the midplane to communicate data packets using a network; and a router module removably coupled to the midplane separate from the plurality of removable interface cards, wherein the midplane provides power to the router module from the power supply, only when the midplane is properly inserted into the midplane, wherein the router module performs route lookups for a first set of the data packets received from the network by a first one of the removable interface cards and for a second set of the data packets received from the network by a second one of the removable interface cards to select routes for the data packets and to forward the data packets between the removable interface cards, wherein the router module comprises a system control module that performs the route lookups, memory, a memory management circuit, and at least one concentrator module that receives the data packets from at least the first one and the second one of the removable interface cards, and wherein the system control module, the memory arrangement circuit, and the concentrator module are integrated into a single unit, wherein the router module receives packets from at least two of the removable interface cards, wherein contents of the received packets are stored in the memory, wherein the memory management circuit generates notifications based on keys of the received packets and forwards the notifications to the system control module, wherein the system control module performs route lookups for the packets based on the keys in response to the notifications, and wherein the concentrator module sends the packets from the memory to the removable interface cards as output bound packets based on the route lookups performed by the system control module in response to the notifications.

17. The routing arrangement of claim 16, wherein the memory comprises an SDRAM device.

18. The routing arrangement of claim 16, wherein the memory management circuit is further configured to provide the notifications to the system control module based on information extracted from incoming data packets.

19. The routing arrangement of claim 18, wherein the extracted information includes at least one of source address information, destination address information, source port information, and destination port information.

20. The routing arrangement of claim 18, wherein the system control module is configured to select a route by referencing a forwarding table based on the extracted information, wherein the forwarding table stores the route information for forwarding data packets received from any of the plurality of removable interface cards.

21. The routing arrangement of claim 20, further comprising a routing engine to store a routing table.

22. The routing arrangement of claim 20, further comprising a memory to store the selected route in the forwarding table.

23. The routing arrangement of claim 16, further comprising a redundant router module to process the data packets and to forward the data packets between the interface modules in response to malfunction of the router module.

24. The routing arrangement of claim 16, wherein the router module is configured to select the route by performing a longer prefix match based on the extracted information.

25. The routing arrangement of claim 16, wherein the packet processing circuit is configured to remove an L2 header from an incoming data packet.

26. The routing arrangement of claim 16, wherein the packet processing circuit is configured to build L2 headers and rewrite L3 headers for the output bound packets.

27. The routing arrangement of claim 16, further comprising a redundant router module to process the data packets and to forward the data packets between the interface modules in response to malfunction of the router module.

28. A router comprising a midplane, a plurality of interface cards coupled to the midplane, a power supply to provide power along the midplane, and one hardware board integrally housing an interface concentrator that provides electrical interfaces to connect to the midplane to receive incoming packets from the plurality of interface cards via the midplane, a packet processing circuit, memory, a memory management circuit, and a route lookup circuit separate from the interface cards to perform route lookups to select routes for a first packet and a second of the incoming packets received from a network by different ones of the plurality of interface cards
wherein the midplane is configured to provide power to the one hardware board from the power supply, only when the one hardware board is properly connected to the midplane at the electrical interfaces,
wherein the interface concentrator receives the data packets from at least two of the interface cards,
wherein contents of the received packets are stored in the memory,
wherein the memory management circuit generates notifications based on keys of the received data packets and forwards the notifications to the route lookup circuit,
wherein the route lookup circuit performs route lookups for the data packets based on the keys in response to the notifications, and
wherein the interface concentrator sends the data packets from the memory to the interface cards as output bound packets based on the route lookups performed by the route lookup circuit in response to the notifications.

29. The router of claim 28, wherein the memory management circuit is configured to provide incoming data to the packet processing circuit.

30. The router of claim 28, wherein the memory management circuit is configured to provide a notification to the route lookup circuit based on information extracted from the incoming data packets.

31. The router of claim 30, wherein the extracted information includes at least one of source address information, destination address information, source port information, and destination port information for each of the incoming packets.

32. The router of claim 30, wherein the route lookup circuit is configured to select the routes by referencing a forwarding table based on the extracted information, wherein the forwarding table stores the route information for forwarding data packets received from any of the plurality of interface cards.

33. The router of claim 32, wherein the route lookup circuit is configured to select the route by performing a longest prefix match based on the extracted information.

34. The router of claim 28, wherein the packet processing circuit is configured to remove an L2 header from an incoming data packet.

35. The router of claim 28, wherein the packet processing circuit is configured to build L2 headers and rewrite L3 headers for the output bound packets.

36. A method of manufacturing a routing device, the method comprising:
providing a plurality of interface modules to communicate data packets using a network;
coupling a midplane to the plurality of interface modules;
coupling a power supply to the midplane; and
coupling a single router module to the midplane;
wherein the midplane is configured to provide power to the single router module from the power supply, only when the single router module is properly inserted into the midplane,
wherein the router module is configured to perform route lookups for data packets received from different ones of the interface modules via the midplane to select routes for the packets in accordance with route information associated with the network and forward the packets back to the interface modules by way of the midplane, and
wherein the router module comprises a system control module, memory, a memory management unit, and at least one concentrator module integrated into a single unit separate from the interface modules
wherein the concentrator module receives the data packets from at least two of the interface cards,
wherein contents of the received data packets are stored in the memory,
wherein the memory management circuit generates notifications based on keys of the received data packets and forwards the notifications to the system control module,
wherein the system control module performs route lookups for the data packets based on the keys in response to the notifications, and
wherein the interface concentrator module sends the data packets from the memory to the interface cards as output bound packets based on the route lookups performed by the system control module in response to the notifications.

37. The method of claim 36, further comprising configuring the memory management circuit to provide the notifications to the system control module based on information extracted from the incoming data packets.

38. The method of claim 37, further comprising configuring the system control module to select a route by referencing a forwarding table based on the extracted information, wherein the forwarding table stores the route information for forwarding data packets received from any of the plurality of interface modules.

39. The method of claim 38, further comprising configuring a routing engine to store a routing table.

40. The method of claim 36, further comprising configuring a redundant router module to process the data packets and to forward the data packets between the interface modules in response to malfunction of the router module.

41. A method of manufacturing a routing arrangement, the method comprising:
   providing a crossbar arrangement; and
   coupling a plurality of routing devices to the crossbar arrangement, at least one routing device comprising:
      a midplane;
      a plurality of interface cards to communicate data packets using a network, wherein each of the plurality of interface cards are coupled to the midplane;
      a power supply coupled to the midplane to supply power along the midplane; and
      a router module separate from the plurality of interface cards to process the data packets and to forward the data packets between the interface cards, wherein the router module is coupled to the midplane;
   wherein the midplane is configured to provide power to the router module from the power supply, only when the router module is properly inserted into the midplane,
   wherein the router module is configured to perform route lookups for the data packets received from different ones of the interface cards to select routes for the packets in accordance with route information associated with the network, wherein the router module includes a packet processing circuit, memory, a memory management circuit, and a route lookup circuit integrated into a single module,
   wherein the packet processing circuit receives the data packets from at least two of the interface cards,
   wherein contents of the received data packets are stored in the memory,
   wherein the memory management circuit generates notifications based on keys of the received data packets and forwards the notifications to the route lookup circuit,
   wherein the route lookup circuit performs route lookups for the data packets based on the keys in response to the notifications, and
   wherein the packet processing circuit sends the data packets from the memory to the interface cards as output bound packets based on the route lookups performed by the route lookup circuit in response to the notifications.

42. A routing arrangement comprising:
   a plurality of routing devices coupled in a crossbar arrangement, at least one routing device comprising:
      a midplane;
      a plurality of interface modules removably coupled to the midplane to communicate data packets using a network;
      a power supply coupled to the midplane to provide power along the midplane,
      a router module removably coupled to the midplane to receive the data packets from at least two different ones of the interface modules, wherein the router module is configured to perform route lookups for the data packets received from the at least two interface modules to select routes for the packets in accordance with route information associated with the network;
      wherein the midplane is configured to provide power to single router module from the power supply, only when the router module is properly inserted into the midplane; and
   a switch arrangement coupled to the plurality of routing devices and configured to switch control from a first routing device to a second routing device, wherein the router module includes a packet processing circuit, memory, a memory management circuit, and a route lookup circuit integrated into a single module,
   wherein the packet processing circuit receives the data packets from at least two of the interface cards,
   wherein contents of the received data packets are stored in the memory,
   wherein the memory management circuit generates notifications based on keys of the received data packets and forwards the notifications to the route lookup circuit,
   wherein the route lookup circuit performs route lookups for the data packets based on the keys in response to the notifications, and
   wherein the packet processing circuit sends the data packets from the memory to the interface cards as output bound packets based on the route lookups performed by the route lookup circuit in response to the notifications.

43. The routing arrangement of claim 42, wherein each of the plurality of routing devices includes a respective router module comprising a respective packet processing circuit, respective memory, a respective memory management circuit, and a respective route lookup circuit integrated into a respective single module.

* * * * *

UNITED STATES PATENT AND TRADEMARK OFFICE
CERTIFICATE OF CORRECTION

| | | |
|---|---|---|
| PATENT NO. | : 7,519,735 B1 | Page 1 of 1 |
| APPLICATION NO. | : 09/851363 | |
| DATED | : April 14, 2009 | |
| INVENTOR(S) | : Ju et al. | |

It is certified that error appears in the above-identified patent and that said Letters Patent is hereby corrected as shown below:

Column 14, line 18 (Claim 42), "single router module" should read -- the router module --

Signed and Sealed this

Thirty-first Day of August, 2010

David J. Kappos
*Director of the United States Patent and Trademark Office*